Dec. 24, 1968   M. DANGAUTHIER   3,417,634
CONTROL DEVICE FOR AN AUTOMOBILE GEAR-BOX
Filed Jan. 31, 1967   3 Sheets-Sheet 2
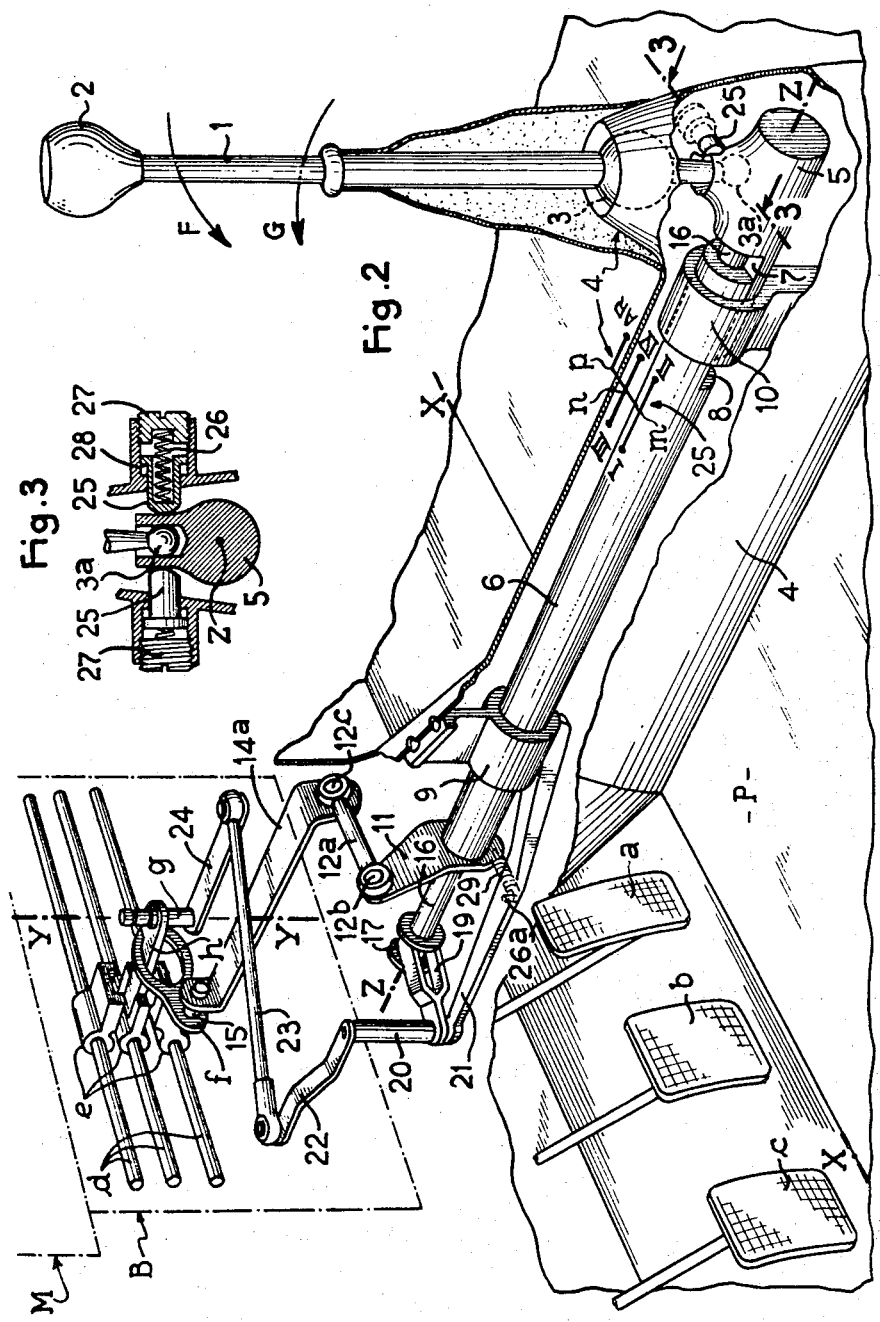

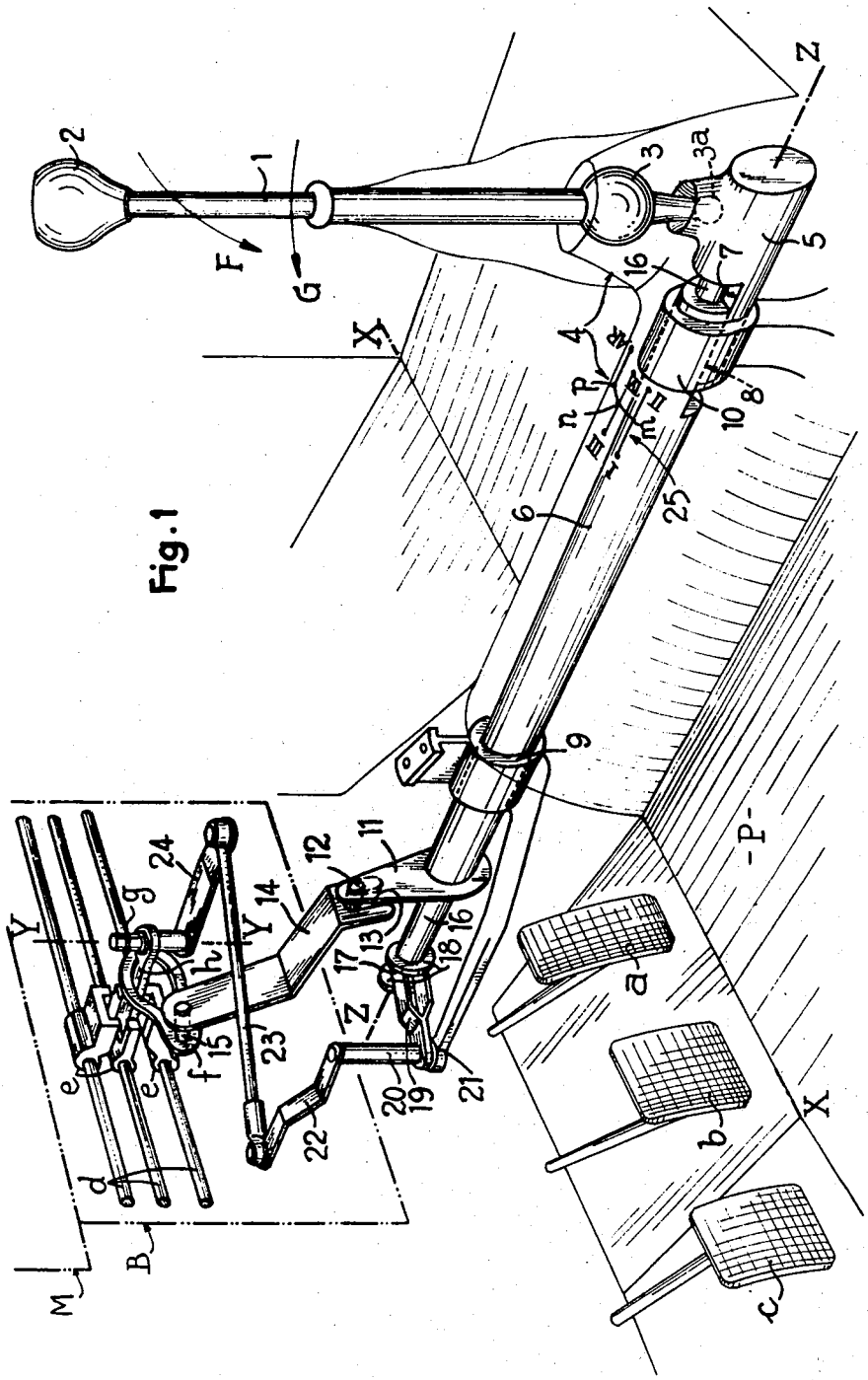

United States Patent Office 3,417,634
Patented Dec. 24, 1968

3,417,634
CONTROL DEVICE FOR AN AUTOMOBILE GEAR-BOX
Marcel Dangauthier, Paris, France, assignor to La Publicite Francaise, Paris, France, a French body corporate
Filed Jan. 31, 1967, Ser. No. 612,963
Claims priority, application France, Feb. 1, 1966, 47,939
9 Claims. (Cl. 74—473)

ABSTRACT OF THE DISCLOSURE

A floor-mounted control device for an automobile gear-box comprising a change-speed lever pivotally mounted on the vehicle floor by means of a ball joint and connected to a block which is rotatable and slidable by the change-speed lever on a fixed axis and is connected to the speed selecting lever and to the speed engaging lever of the gear-box in such manner that angular oscillations of the block about said axis shifts the selecting lever and axial movements of the block along said axis shifts the speed engaging lever.

---

The present invention relates to control devices for an automobile vehicle gear-box. It is more particularly related to an improved floor-mounted control device for the gear-box of a motor vehicle whose drive unit is disposed transversely, this device being simple in construction, devoid of a cable connection which is always costly and fragile and capable of being substituted for a steering wheel-mounted control device without modification of the operating levers, namely the speed selecting lever and the speed engaging lever carried by the gear-box.

The control device according to the invention is particularly easy to mount and reliable in operation and comprises in combination a change-speed lever pivoted by means of a ball joint on a support carried by the vehicle floor, a block engaged by the end of said change-speed lever and rotatable and slidable on a fixed axis, and connecting means between said block and the speed selecting lever and the speed engaging lever of the gear-box, whereby angular oscillations of said block around said fixed axis shifts the selecting lever whereas axial movements of said block shifts the speed engaging lever.

Further features and advantages of the invention will be apparent from the ensuing description with reference to the accompanying drawings.

In the drawings:

FIG. 1 is a perspective view, with parts cut away, of a device according to the invention mounted on an automobile vehicle having a transverse driving engine unit;

FIG. 2 is a perspective view, with parts cut away, of a first modification of the device according to the invention;

FIG. 3 is a sectional detail view taken along line 3—3 of FIG. 2, and

Figure 4:
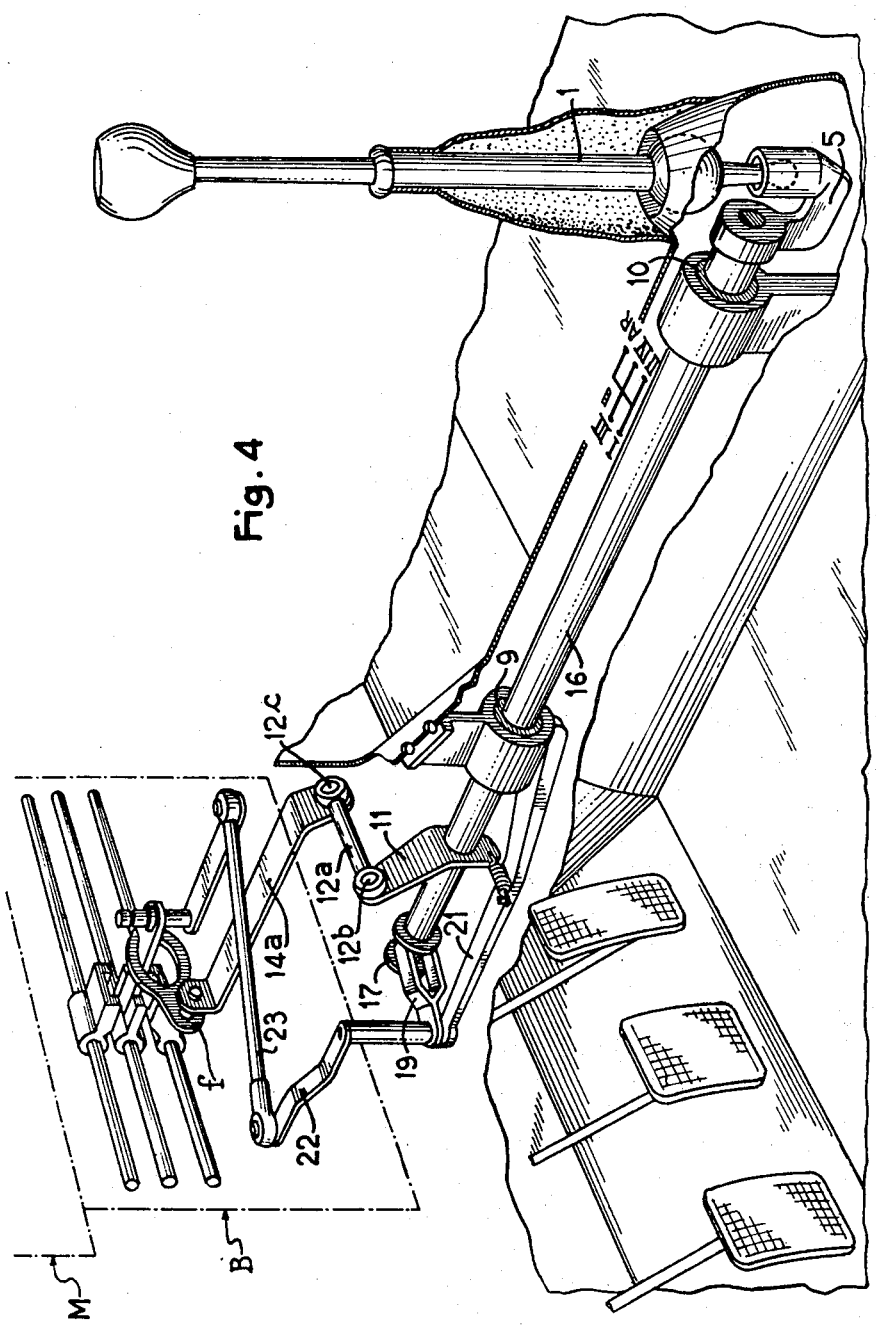
FIG. 4 is a perspective view of a second modification of the device according to the invention.

In the embodiment shown in FIG. 1, the invention is applied to the control of a gear-box which is diagrammatically represented by the rectangle B and located at the output end of a driving engine unit M which is transversely disposed relative to the vehicle, the gear-box being located under this unit. The transverse direction of the vehicle corresponds to the line X—X on the level of the floor P and to the positions of the conventional pedals, namely the accelerator pedal $a$, the brake pedal $b$ and the clutch pedal $c$.

As concerns the gear-box, only the conventional linkages $d$ controlling the shifting forks inside the gear-box casing have been shown. It is known that when changing the speeds each link or rod $d$ corresponding to a given gear ratio moves from the right to the left or from the left to the right of the vehicle from the neutral position and drives the corresponding fork and consequently the corresponding sleeve of the synchronizer or the mobile gear pinion in the gear-box B. A control block $e$ is disposed on each rod $d$.

The rod $d$ to be actuated is selected by means of a selecting lever $f$ in the form of a fork which shifts in translation a speed engaging lever $h$ along a pin $g$ having an axis Y—Y on which it is slidably keyed. The speeds are engaged by the rotation of the lever $h$ with the rod $g$ about the axis Y—Y.

For the purpose of controlling the selecting lever $f$ and the change-speed lever $h$, there is provided a floor-mounted control device which will now be described.

This control device comprises an operating or change-speed lever 1 with a knob 2 capable of swinging in all directions, owing to provision of a ball joint 3, in a support diagrammatically shown at 4 and rigidly secured to the floor P.

The end 3a of the lever 1 is engaged in a block 5. The latter is slidably keyed on a tubular shaft 6 owing to the provision of complementary longitudinally extending notches 7 and 8 formed in the block and the shaft. The shaft 6 is journalled to rotate on a longitudinal axis Z—Z in bearings 9 and 10 which are rigid with the support 4 or directly secured to the floor or body of the vehicle.

This shaft 6 carries at its forward end a crank arm 11 whose crank pin 12 is engaged in a slot 13 in an arm 14. The latter is connected to rotate with a shaft 15 on which the selecting lever $f$ is keyed, this shaft 15 being rotatable about its own axis.

Thus it is clear that when the lever 1 pivots in the direction of arrow F or in the opposite direction, that is, in a transverse plane of the vehicle, it is possible to pivot the lever $f$ so as to bring the speed engaging lever $h$ in engagement with any one of the three blocks $e$.

The block 5, shifted by the change-speed lever 1, is fixed to a rod 16 which is journalled and slidable in the tubular shaft 6, this rod extending beyond the two ends of the shaft 6.

At its forward end, the rod 6 has a groove 17 which is defined by two flanges 18 rigid with the rod 6. Engaged in the groove 17 is a fork 19 which is rigid with a pin 20 journalled in a support 21. A crank arm 22 is also secured to this pin and is connected by a connecting rod 23 to an arm 24 which is keyed, in the same way as the speed engaging lever $h$, on the pin $g$ which is rotatable about its own axis Y—Y.

As will be understood, pivotal movement of the lever 1 forwardly or rearwardly in the direction of arrow G, or in the opposite direction, shifts the rod 16 longitudinally relative to the tubular shaft 6 and pivots the assembly 19–20–22 about the axis of the pin 20 and consequently turns the arm, the pin $g$ and the lever $h$ about the axis Y—Y for engaging the speeds.

Marked on the support 4 is the diagram 25 of the change-speed grid. The points $m$ $n$ $p$ correspond to the three speed selection positions obtained by transversely pivoting the lever 1 in the direction of the arrow F, or in the opposite direction. Thus, the four speeds I, II, III, IV and the reverse speed AR are obtained from these positions by pivoting the lever 1 in the longitudinal plane of the vehicle in the direction of the arrow G or in the opposite direction.

When selecting a speed, the shaft 6 is rotated together with the rod 16 since the latter is fixed to the block 5 and this block 5 is slidably keyed on the tubular shaft 6. However, in the course of this rotation, which shifts the selecting lever f, the speed engaging lever h is not shifted since the groove 17 of the rod 16 merely rotates between the two branches of the fork 19 which remains stationary.

On the other hand, to engage the speeds after selection, the pivoting of the lever 1 forwardly or rearwardly shifts the rod 16 longitudinally relative to the stationary tubular shaft 6 and the groove 17, or more precisely, one of the flanges 18 defining this groove pivots the fork 19 and shifts the lever h.

FIGS. 2 and 3 show a modification of the control device which is very similar to the preceding device. The same reference numerals represent identical parts. The presently-described control device differs from the preceding device in respect of the following points.

The crank arm 11 fixed to the forward end of the shaft 6 is connected by a connecting rod 12a to a lever 14a which is connected to rotate with the pin 15 on which latter the selecting lever f is keyed.

The connecting rod 12a extends transversely of the vehicle and is horizontal and consequently at least roughly parallel to the line X—X. This connecting rod is pivoted to the arm 11 and the lever 14a by two ball joints 12b and 12c or equivalent means.

Thus it is clear that pivoting the lever 1 in the direction of arrow F or in the opposite direction, that is, in a transverse plane of the vehicle, it is possible, as in the first embodiment, to pivot the selecting lever f so as to bring the speed engaging lever h in engagement with any one of the three blocks e.

Further, owing to the orientation of the connecting rod 12a relative to the vehicle, any movement of the assembly comprising the driving engine unit M and the gear-box B either vertically or horizontally in the longitudinal direction of the vehicle, is practically without effect on the position of the lever 14a relative to the arm 11 and consequently without effect on the selecting lever f and the selection.

The control device is furthermore completed by one or two elastically yieldable means for producing a return to the selection line III–IV, and/or a stiffness in the selection of the reverse speed. For this purpose, the block 5, or any other movable selecting means, can be biased by one or two elastically yieldable means. Thus, FIGS. 2 and 3 show in full line respectively one and two thrust elements 25 having a spring 26 supported for example in the wall of the support 4 against an adjusting screw 27 in such manner that the compression of this spring produces a return torque about the axis Z—Z when the block 5 rotates in a given direction about this axis so as to tend to return it to the selection line III–IV. In the selection position III–IV the springs can be rendered inoperative by the action of an abutment 28 of the considered thrust element.

Note that the same effect can be obtained by placing a spring (or two springs) at 26a between the arm 11 and one or two fixed points 29.

FIG. 4 shows another modification in which the rod 16 on which the block 5 is fixed is journalled and slidable directly in bearing 9 and 10. Fixed to the end thereof, beyond the bearing 9, is the arm 11 which is connected, by the horizontal and transversely extending connecting rod 12a and ball joints or equivalent means 12b, 12c, to the lever 14a controlling the selecting lever f. Further, the rod 16 comprises, as in the preceding embodiments, the groove 17 which engages the arm 19 for engaging the speeds.

The control for selecting by rotation of the rod 16 and the control for engaging the speeds by axial movement of this rod can be effected independently of each other since the selecting rotation does not act on the arm 19 owing to the effect of the groove 17 and the axial movement of the rod 16 for engaging the speeds is so small that the consequential pivoting in a horizontal plane of the connecting rod 12a about the ball joints 12b, 12c substantially does not shift the ball joint 12c and selecting lever f.

As can be seen, the control devices according to the invention are extremely simple in construction and can be very easily placed in position or removed according as it is desired to change from a control of the gear-box from the steering wheel to a floor control thereof or replace the device by a control from the steering wheel.

These control devices comprise no cable which is always expensive and fragile. They are very simple in construction and perfectly strong.

Although specific embodiments of the invention have been described, many modifications and changes may be made therein without departing from the scope of the invention as defined in the appended claims.

Having now described my invention what I claim as new and desire to secure by Letters Patent is:

1. A floor-mounted control device for the gearbox of an automobile vehicle having a floor and a driving engine unit extending transversely of the vehicle, said gear-box comprising a speed selecting lever and a speed engaging lever, said control device comprising a fixed support structure carried by said floor, a change-speed lever pivoted by means of a ball joint to said fixed support structure, a block rotatable about a fixed axis and axially movable along said axis relative to said support structure, said change-speed lever having an end operatively connected to said block, connecting means connecting said block to said speed selecting lever, and connecting means connecting said block to said speed engaging lever, whereby rotation of said block about said fixed axis relative to said support structure shifts said speed selecting lever and axial movement of said block along said fixed axis relative to said support structure shifts said speed engaging lever.

2. A control device as claimed in claim 1, comprising a crank arm connected to rotate with said block, and a control lever connected to said crank arm and to said speed selecting lever.

3. A control device as claimed in claim 1, comprising a crank arm connected to rotate with said block, a crank pin carried by said crank arm and a control lever provided with a slot in which said crank pin is engaged.

4. A control device as claimed in claim 1, comprising a crank arm connected to rotate with said block, a control lever substantially horizontal and extending transversely of the vehicle, a connecting rod connecting said crank arm to said control lever, said connecting rod being pivotally connected to said crank arm and said control lever by joints allowing angular movement of said connecting rod in all directions relative to said crank arm and said control lever, said control lever being connected to said speed selecting lever.

5. A control device as claimed in claim 1, comprising a rod which is rotatable about said fixed axis and axially movable along said fixed axis, a peripheral groove in said rod and a linkage connecting said groove to said speed engaging lever, said block being rigid with said rod.

6. A control device as claimed in claim 5, comprising a tubular shaft journalled in fixed bearings, said block being slidably keyed relative to said tubular shaft, a crank arm mounted on said shaft, a control lever connected to said crank arm and operatively connected to said speed selecting lever for controlling said selecting lever, an arm operatively connected to said speed engaging lever, said arm being engaged in said peripheral groove, said rod being slidably mounted in said tubular shaft.

7. A control device as claimed in claim 5, comprising a crank arm connected to rotate with said block, and a control lever connected to said crank arm and to said speed selecting lever, said crank arm being connected directly to said rod.

8. A control device as claimed in claim 1, comprising at least one elastically yieldable means provided between said support structure and said block for exerting a torque on said block to return said block and said change-speed lever to a position corresponding to a given speed selection.

9. In an automobile vehicle having a floor, the structure comprising in combination a driving engine unit and a gear box disposed transversely of the vehicle, said gearbox comprising a speed selecting lever and a speed engaging lever, and a control device for changing the speeds of said gear-box, said control device comprising a fixed support structure carried by said floor, a change-speed lever pivoted by means of a ball joint to said fixed support structure, a block rotatable about a fixed axis and axially movable along said axis relative to said support structure, said change-speed lever having an end operatively connected to said block, connecting means connecting said block to said speed selecting lever, and connecting means connecting said block to said speed engaging lever, whereby rotation about said fixed axis relative to said support structure shifts said speed selecting lever and axial movement of said block along said fixed axis relative to said support structure shifts said speed engaging lever.

References Cited
UNITED STATES PATENTS 2,077,578   4/1937   Neracher   74—473
2,550,403   4/1951   Carmichael   74—483 XR FRED C. MATTERN, JR., *Primary Examiner.*

JAMES A. WONG, *Assistant Examiner.*